(12) United States Patent
Bittner

(10) Patent No.: US 11,343,955 B2
(45) Date of Patent: May 31, 2022

(54) SPRAY BOOM STRUCTURE WITH FOLDING ELEMENTS

(71) Applicant: CNH Industrial America LLC, New Holland, PA (US)

(72) Inventor: Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 339 days.

(21) Appl. No.: 16/444,048

(22) Filed: Jun. 18, 2019

(65) Prior Publication Data
US 2020/0396891 A1 Dec. 24, 2020

(51) Int. Cl.
| | | |
|---|---|---|
| A01B 73/06 | (2006.01) | |
| A01G 25/00 | (2006.01) | |
| B05B 1/20 | (2006.01) | |
| A01M 7/00 | (2006.01) | |

(52) U.S. Cl.
CPC .......... *A01B 73/067* (2013.01); *A01G 25/00* (2013.01); *A01M 7/0075* (2013.01); *B05B 1/20* (2013.01)

(58) Field of Classification Search
CPC .... A01B 73/067; A01G 25/00; A01M 7/0075; B05B 1/20
USPC .................................. 239/166–169, 172, 175
See application file for complete search history.

(56) References Cited

U.S. PATENT DOCUMENTS

| | | | |
|---|---|---|---|
| 4,372,492 A | 2/1983 | Blumenshine | |
| 5,310,115 A * | 5/1994 | Broyhill | A01M 7/0075 239/168 |
| 6,966,501 B2 | 11/2005 | Wubben et al. | |
| 8,899,496 B2 | 12/2014 | Wissler et al. | |
| 9,462,799 B2 | 10/2016 | Bouten | |
| 9,839,211 B2 | 12/2017 | DePriest et al. | |
| 2006/0201075 A1 | 9/2006 | Rivas et al. | |
| 2012/0012673 A1 | 1/2012 | Hedegaard | |
| 2016/0374328 A1 | 12/2016 | Beggs | |

FOREIGN PATENT DOCUMENTS

| | | |
|---|---|---|
| CN | 204930082 U | 1/2016 |
| CN | 105660579 A | 6/2016 |
| CN | 207305879 U | 5/2018 |
| EP | 0278925 A2 | 10/1988 |

OTHER PUBLICATIONS

Chen et al.; Experiment and structure shape and section size optimization of spray boom; Nov. 20, 2018; 3 pages; available at: https://www.ingentaconnect.com/content/tcsae/tcsae/2015/00000031/00000009/art00009.

* cited by examiner

*Primary Examiner* — Christopher S Kim
(74) *Attorney, Agent, or Firm* — Rebecca L. Henkel; Rickard K. DeMille

(57) ABSTRACT

A spray boom for an agricultural machine includes a first section having a first end and a second end and a second section having a first end pivotably coupled to the second end of the first section. The first section includes a first support member and a second support member disposed above the first support member. A centerline of the second support member is horizontally offset from a centerline of the first support member. Meanwhile, the second section includes a first support member. The spray boom may be configured in an extended position or a folded position. In the folded position, the second section is disposed above the first support member of the first section and adjacent the second support member.

8 Claims, 10 Drawing Sheets

US 11,343,955 B2

SPRAY BOOM STRUCTURE WITH FOLDING ELEMENTS

FIELD OF THE INVENTION

The present invention relates generally to a spray boom structure for an agricultural sprayer, and, more particularly, a spray boom structure having folding elements off-center from a typical symmetrical location to provide volume to fold the outer portions within the spatial confines of the inner portions.

BACKGROUND OF THE INVENTION

As spray booms get larger over time, it is increasingly more difficult with conventional boom structure and hinges to fold the components into a small enough package for transport or storage of the sprayer. The bulkiness of this folded package, especially on larger sprayers ends up causing the sprayer to be either too high or too wide to transport on the roads. Additionally, the bulkiness of this folded package may crowd the space near the cab entrance increasing the difficulty of the operator to use the ingress/egress.

Current truss boom designs are typically triangular in cross-section and implement a series of hinges down the length of the cantilevered wing to facilitate folding for transport. The hinges typically pivot 180 degrees and place an outer portion either on top or alongside the inner portion.

SUMMARY OF THE INVENTION

According to one aspect of the invention, a spray boom for an agricultural machine includes a first section having a first end and a second end and a second section having a first end pivotably coupled to the second end of the first section. The first section includes a first support member and a second support member disposed above the first support member. A centerline of the second support member is horizontally offset from a centerline of the first support member. Meanwhile, the second section includes a first support member. The spray boom may be configured in an extended position or a folded position. In the folded position, the second section is disposed above the first support member of the first section and adjacent the second support member.

In accordance with another aspect of the invention, the spray boom includes a third section having a first end pivotably coupled to a second end of the second section. Similar to the second section, the third section includes a first support member. In the folded position, the third section is disposed below the second section and above the first support member of the first section.

In accordance with yet another aspect of the invention, the first section includes at least one vertical support element. Each vertical support element has a first end coupled to the first support member and a second end coupled to the second support member. In addition, each vertical support element is configured to horizontally offset the centerline of the second support member from the centerline of the first support member.

In accordance with another aspect of the invention, the first section includes a storage opening disposed above the first support member and adjacent a rear side of the second support member. In the folded position, the second section is disposed within the storage opening.

In accordance with yet another aspect of the invention, the first support member of the first section is oriented parallel to a ground surface, while the second support member of the first section is oriented at an angle with respect to the first support member. In the extended position, the first support member of the first section and the first support member of the second section are oriented along the same axis.

According to another aspect of the invention, a method of manufacturing a spray boom includes forming a first section of the spray boom having a first end and a second end and pivotably coupling a first end of a second section to a second end of the first section. Forming the first section of the spray boom includes disposing a second support member above a first support member. A centerline of the second support member is horizontally offset from a centerline of the first support member. The second section includes a first support member. The spray boom may be pivoted between an extended position and a folded position. In the folded position, the second section is disposed above the first support member and adjacent the second support member.

In accordance with yet another aspect of the invention, the method may further include pivotably coupling a first end of a third section to a second end of the second section. The third section includes a first support member. In the folded position, the third section is disposed below the second section and above the first support member of the first section.

In accordance with another aspect of the invention, forming the first section of the spray boom may also include disposing at least one vertical support element between the first and second support members. A first end of each vertical support element is coupled to the first support member, while a second end of each vertical support element is coupled to the second support member. Each vertical support element horizontally offsets the centerline of the second support member from the centerline of the first support member. Further, horizontally offsetting the centerline of the second support member from the centerline of the first support member results in a storage opening disposed above the first support member and rearward of the second support member. In the folded position, the second section is disposed within the storage opening.

According to yet another aspect of the invention, an agricultural machine includes a lift arm assembly and at least one spray boom coupled to the lift arm assembly. Each spray boom includes a primary section having a first end and a second end and a secondary section having a first end pivotably coupled to the second end of the primary section. The primary section has a first support member, a second support member disposed above the first support member, and at least one vertical support element disposed between the first and second support members. Each vertical support element has a first end coupled to the first support member and a second end coupled to the second support member. A centerline of the second support member is horizontally offset from a centerline of the first support member. The secondary section includes at least one section having a first support member. Further, the spray boom is configured to be oriented in one of an extended position and a folded position. In the folded position, the second section is disposed above the first support member of the first section and adjacent the second support member of the first section.

In accordance with another aspect of the invention, the first support member, the at least one vertical support element, and the second support member of the primary section form an L-shaped cross-section. In addition, the primary section includes a storage opening disposed above the first support member and adjacent a rear side of the second support member. In the folded position, the secondary section is disposed within the storage opening. Meanwhile, in the extended position, the first support member of the primary section and first support member of the secondary section are oriented along the same axis.

In accordance with yet another aspect of the invention, the spray boom may also be oriented in a retracted position. In the retracted position, the secondary section is disposed above the first support member of the primary section and adjacent the second support member of the primary section. In addition, the spray boom is oriented parallel to a direction of motion of the agricultural machine.

These and other aspects and features of the present invention will be more fully understood from the following detailed description and the enclosed drawings.

DESCRIPTION OF THE FIGURES

Preferred exemplary embodiments of the invention are illustrated in accompanying drawings in which like reference numerals represent like parts throughout.

Figure 1:
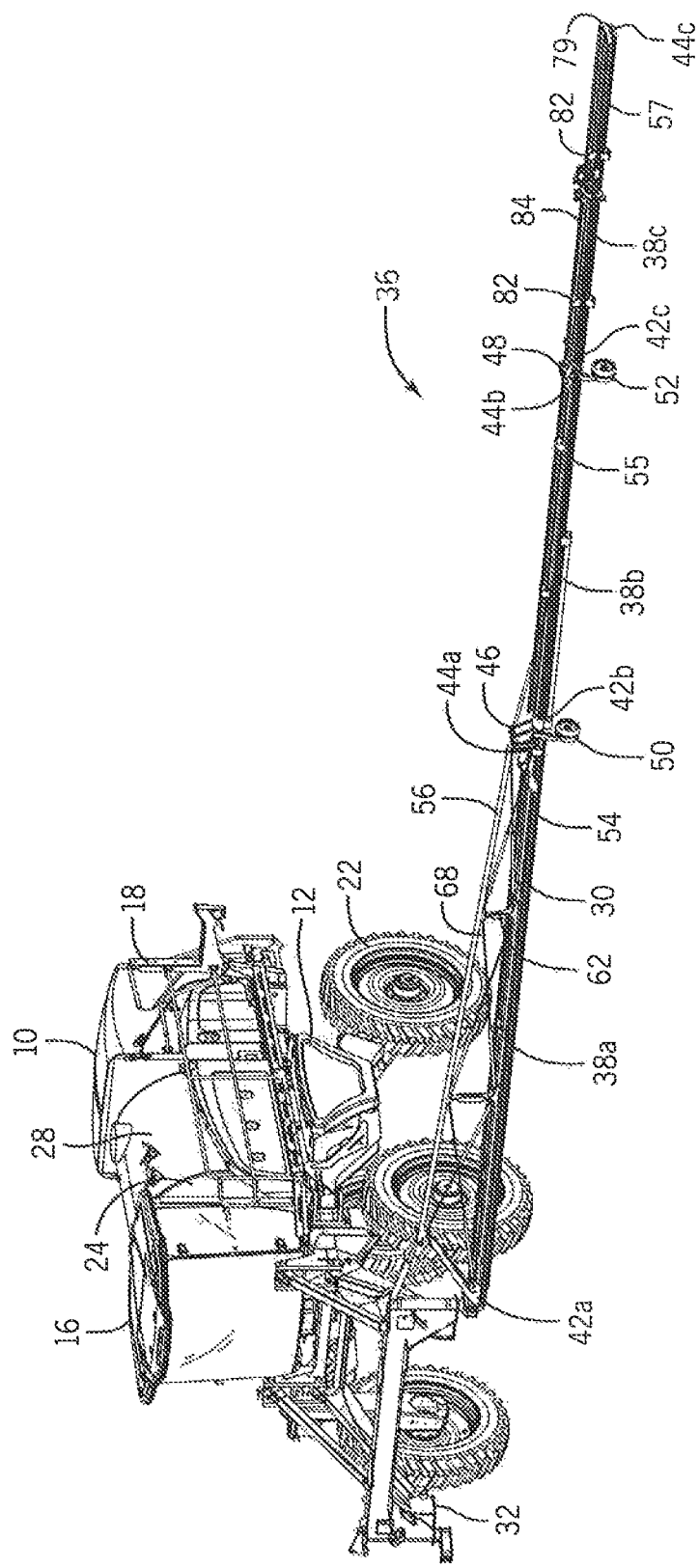
FIG. 1 is a perspective view of an agricultural sprayer having a spray boom in an extended position.

Before describing any preferred, exemplary, and/or alternative embodiments of the invention in detail, it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION

Referring now to the drawings and specifically to FIG. 1, aspects of the invention are shown for use with an agricultural machine 10, for example, but not limited to, an agricultural sprayer. The agricultural machine 10 shown in FIG. 1 is a self-propelled agricultural sprayer vehicle or self-propelled sprayer 10, shown here as a front-boom sprayer. Although sprayer 10 is shown as a front-boom self-propelled sprayer, it is understood that the sprayer 10 may instead be configured as a rear-boom sprayer.

Still referring to FIG. 1, the sprayer 10 includes a chassis 12 having a chassis frame 14 that supports various assemblies, systems, and components. These various assemblies, systems, and components can include an operator cab 16, an engine 18, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a product tank 28 for storing a volume of product for delivery onto an agricultural field with the sprayer 10. A product delivery pump can convey product from the product tank 28 through plumbing components such as interconnected pieces of tubing and through a boom tubing system for release out of spray nozzles that are spaced from each other along the width of boom 30 during spraying operations of the sprayer 10. Groups or banks of multiple adjacent spray nozzles define multiple spray sections of the spray system. Spray sections are defined along the boom 30 and selectively deliver product for release onto an agricultural field at locations corresponding to positions of activated spray sections. The boom 30 is connected to the chassis 12 with the lift arm assembly 32 that is configured to manipulate the boom 30 in a variety of directions to both adjust the height of application of the product and transition the boom 30 between a retracted position 34, as shown in FIG. 10, and an extended position 36, as shown in FIG. 1. While FIGS. 1, 4-6, and 9-10 display a single boom 30 coming from one side of the lift arm assembly 32, embodiments of the invention may include a boom 30 coming from both sides of the lift arm assembly 32.

As further shown in FIG. 1, the spray boom 30 includes a number of sections 38. In the extended position 36, the sections 38 of the boom 30 are oriented in line with each other so as to extend outward and be cantilevered from the lift arm assembly 32 of the sprayer 10. The sections 38 are configured to be connected to each other via hinges that allow the sections 38 to fold in on each other and transition the boom 30 from the extended position 36 to a folded position 40, as shown in FIGS. 6-9. The boom 30 may then be rotated from the folded position 40, in which the boom 30 is perpendicular to the sprayer 10, to the retracted position 34, in which the boom 30 is parallel to the sprayer 10. In the representative embodiment of the invention, the spray boom 30 includes three (3) sections 38. In other embodiments, of the invention, the spray boom 30 may include any number of sections 38.

As stated above, FIG. 1 depicts the spray boom 30 in the extended position 36. Each section 38 extends from a first end 42 to a second end 44. The first section 38a is positioned adjacent the sprayer 10. As shown, the first end 42a of the first section 38a is coupled to the lift arm assembly 32 of the sprayer 10. Meanwhile, the first end 42b of the second section 38b is pivotably coupled to the second end 44a of the first section 38a via a hinge 46. Similarly, the first end 42c of the third section 38c is pivotably coupled to the second end 44b of the second section 38b via another hinge 48. In the representative embodiment of the invention, a wheel 50 is disposed at hinge 46 and a wheel 52 is disposed at hinge 48. The wheels 50, 52 are configured to extend from the boom 30 and contact the ground in order to assist in supporting the boom 30 when it is in the extended position 36.

Figure 2:
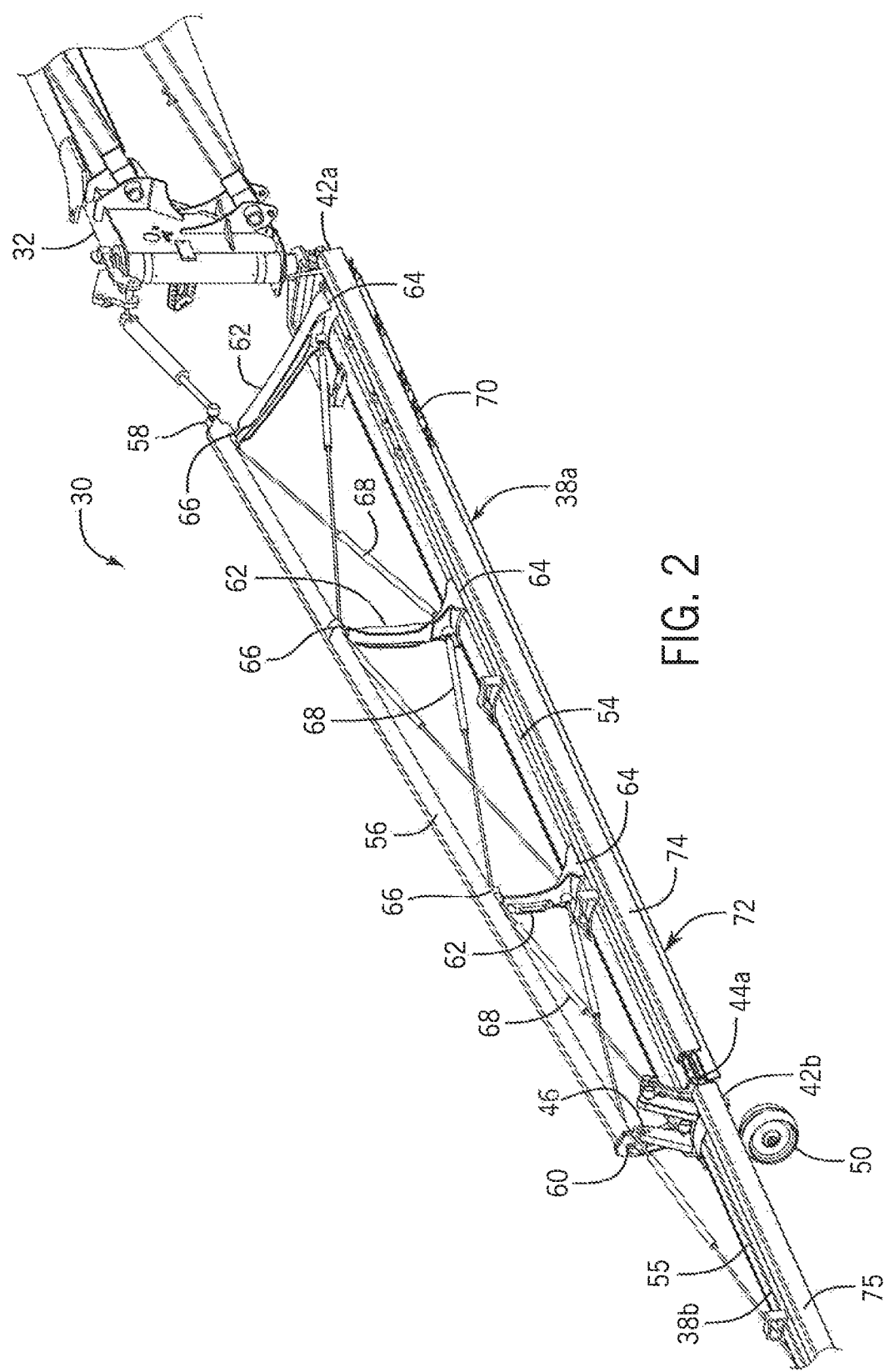
FIG. 2 is an enlarged perspective view of a section of the spray boom of FIG. 1.

Referring next to FIG. 2, an enlarged perspective view is shown of the first section 38a of the boom 30. The first section 38a includes a first support member 54 and a second support member 56. When the boom 30 is in the extended position 36, the first support member 54 may be oriented parallel to the ground. However, adjustment of the lift arm assembly 32 adjusts the height of the first end 42a of first section 38a, which may affect the orientation of the first support member 54 as it extends from the first end 42a to the second end 44a. The second support member 56 is disposed above the first support member 54 and extends from a first end 58 to a second end 60. As shown in FIG. 2, the second support member 56 may be oriented at an angle with respect to the first support member 54. For example, the second support member 56 may be oriented so that the second end 60 is closer to the first support member 54 than the first end 58.

A number of vertical supports shown as vertical support elements 62 may be oriented to extend from the first support member 54 to the second support member 56. Each vertical support element 62 includes a first end 64 coupled to the first support member 54 and a second end 66 coupled to the second support member 56. As shown in FIG. 2, the vertical support elements 62 may be distributed along the length of the first section 38a. While the representative embodiment of the invention illustrates the use of three (3) vertical support element 62, varying embodiment of the invention may use any number of vertical support elements 62 extending between any locations along the lengths of the first and second support members 54, 56. As will be described in further detail below, the vertical support elements 62 are configured to offset the support members 54, 56 so that they are oriented along different vertical planes.

The first section 38a may also include a number of struts 68 extending between adjacent vertical supports or vertical support elements 62. The first section 38 may include struts 68 along the entire length of the first section 38a, from a location adjacent the first end 42a to a location adjacent the second end 44a. In the representative embodiment of the invention, two (2) struts 68 extend between adjacent vertical support elements 62. For example, one strut 68 may extend from the second end 66 of the vertical support element 62 adjacent the first end 58 of the second support member 56 to the first end 64 of the next vertical support element 62, while another strut 68 may extend from the first end 64 of the vertical support element 62 adjacent the first end 58 of the second support member 56 to the second end 66 of the next vertical support element 62. That is, the two (2) struts 68 between each vertical support element 62 may crisscross as they extend between the vertical support elements 62. FIG. 2 further illustrates that a strut 68 may extend from the hinge 46 to a location on the second section 38b.

In another embodiment of the invention, a single strut 68 may extend from the second end 66 of the vertical support element 62 adjacent the first end 58 of the second support member 56 to the first end 64 of the next vertical support element 62, another strut 68 may extend from the first end 64 of that vertical support element 62 to the second end 66 of the next vertical support element 62, and anther strut 68 may extend from the second end 66 of the that vertical support element 62 to the hinge 46 located adjacent the second end 44a of the section 38a. That is, adjacent struts 68 are oriented to alternate diagonally between the first and second ends 64, 66 of adjacent vertical support elements 62 as the struts 68 span the length of the section 38a. As a result, the second and third sections 38b, 38c are supported by the strength of the support members 54, 56, vertical support elements 62, and struts 68 of the first section 38a.

In the representative embodiment of the invention, the first support member 54 of the first section 38a includes a number of nozzles 70 disposed on the rear side 72 of the support member 54. The nozzles 70 may be disposed at any interval along either the entire length of the support member 54 or a partial length of the support member 54. In turn, a product line 74 is coupled to the support member 54 and supports the nozzles 70. The product line may extend along the entire length of the support member 54 or a partial length of the support member 54.

Referring again to FIG. 1, the second section 38b is pivotably coupled to the first section 38a via the hinge 46. The second section 38b includes a support member 55 similar to support member 54 of the first section 38a. In the representative embodiment of the invention, the second section 38b also includes a product line 75 similar to product line 74. Product line 75 is coupled to the support member 55 and may extend along the entire length thereof or a partial length thereof. Nozzles (not shown) may be supported by the product line 75 and disposed along either the entire length of the support member 55 or a partial length of the support member 55. In the extended position 36, the support member 55 of the second section 38b may oriented substantially parallel to the ground and along the same axis as the first section 38a.

The third section 38c is then pivotably coupled to the second section 38b via the hinge 48, The third section 38c includes a support member 57 similar to previously described support members 54, 55. A product line 77 is coupled to the support member 57 and may extend along the entire length thereof or a partial length thereof. In the representative embodiment of the invention, a distal end 79 of the product line 77 is curved to align with and connect to the second end 44c of the support member 57 of the third section 38c. Nozzles (not shown) may be supported by the product line 77 along the entire length or a portion of the length of the support member 57. In the extended position, the support member 57 of the third section 38c is oriented along the same axis as the second section 38b.

Figure 3:
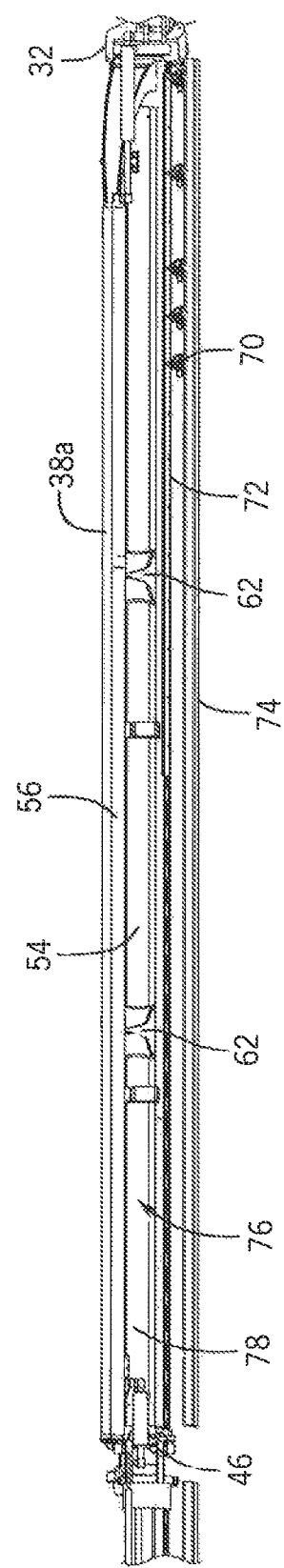
FIG. 3 is a top view of the section of the spray boom of FIG. 2.

Next, FIG. 3 illustrates the horizontal offset of the support members 54, 56. That is, a centerline of the first support member 54 and a centerline of the second support member 56 are oriented along different vertical planes. In the representative embodiment of the invention, the vertical plane of the centerline of the second support member 56 is displaced forward of the vertical plane of the centerline of the first support member 54. In addition, the second support member 56 is sized to have a width less than the width of the first support member 54. As a result, the first section 38a includes a storage opening 76 disposed above the first support member 54 and adjacent a rear side 78 of the second support member 56.

As a result of the horizontal offset of the support members 54, 56, the first section 38a of the boom 30 has an L-shaped cross-section, as opposed to the standard triangular cross-section. That is, the horizontal arm of the L-shape is formed by the first support member 54 and the vertical arm of the L-shape is formed by the vertical support elements 62, struts 68, and second support member 56. As a result, the vertical support elements 62 assist in horizontally offsetting the centerlines of the first and second support members 54, 56. While L-shaped cross-sections are typically weak in longitudinal torsion, the tubular form of the first support member 54 provides the necessary rigidity to be very rigid in longitudinal torsion. It should also be noted that, in the extended position 36 the center of gravity is aligned with the first support members 54, 55, 57 of the sections 38a, 38b, 38c.

Figure 4:
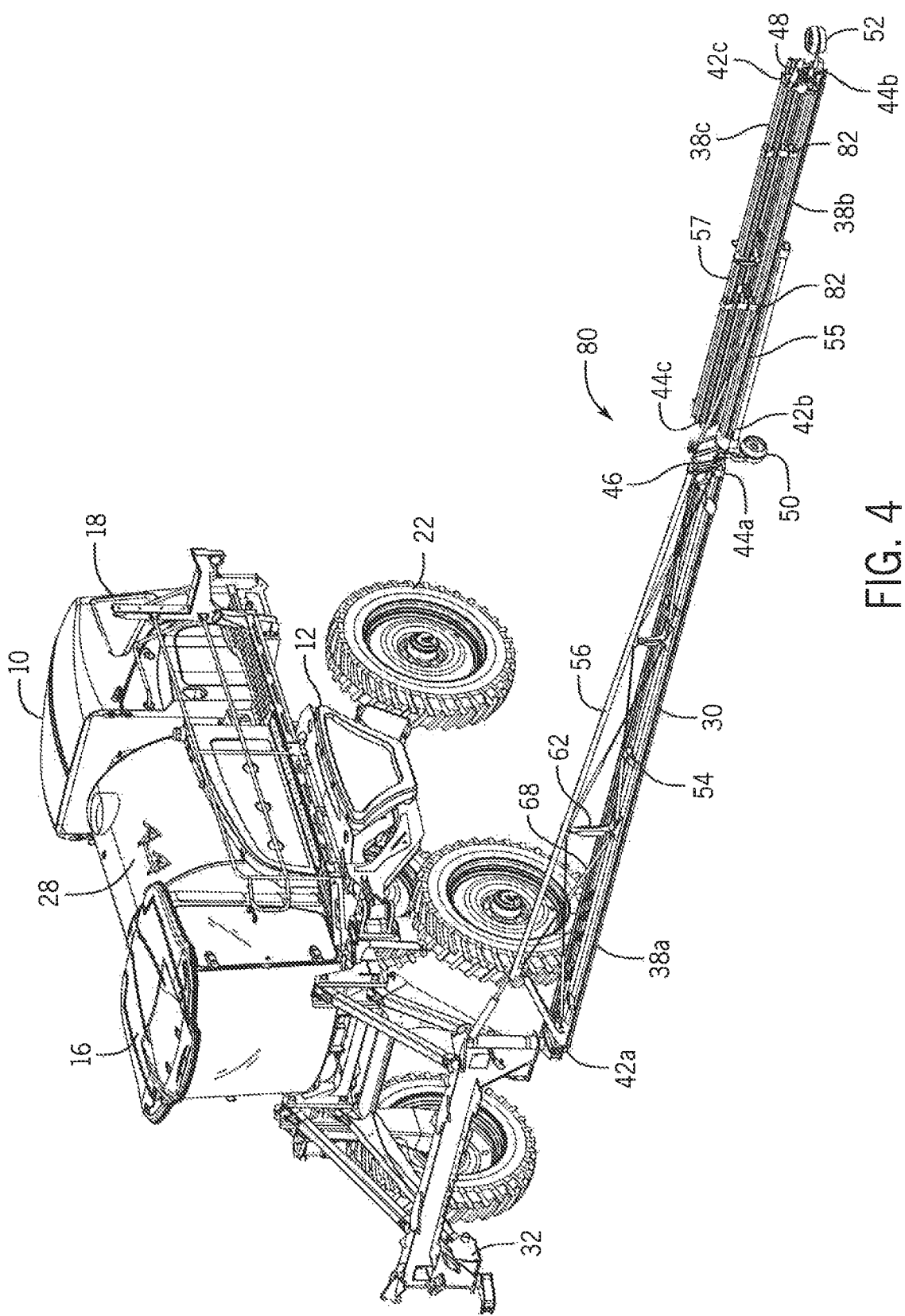
FIG. 4 is a perspective view of the agricultural sprayer having the spray boom in a partially folded position.
Figure 5:
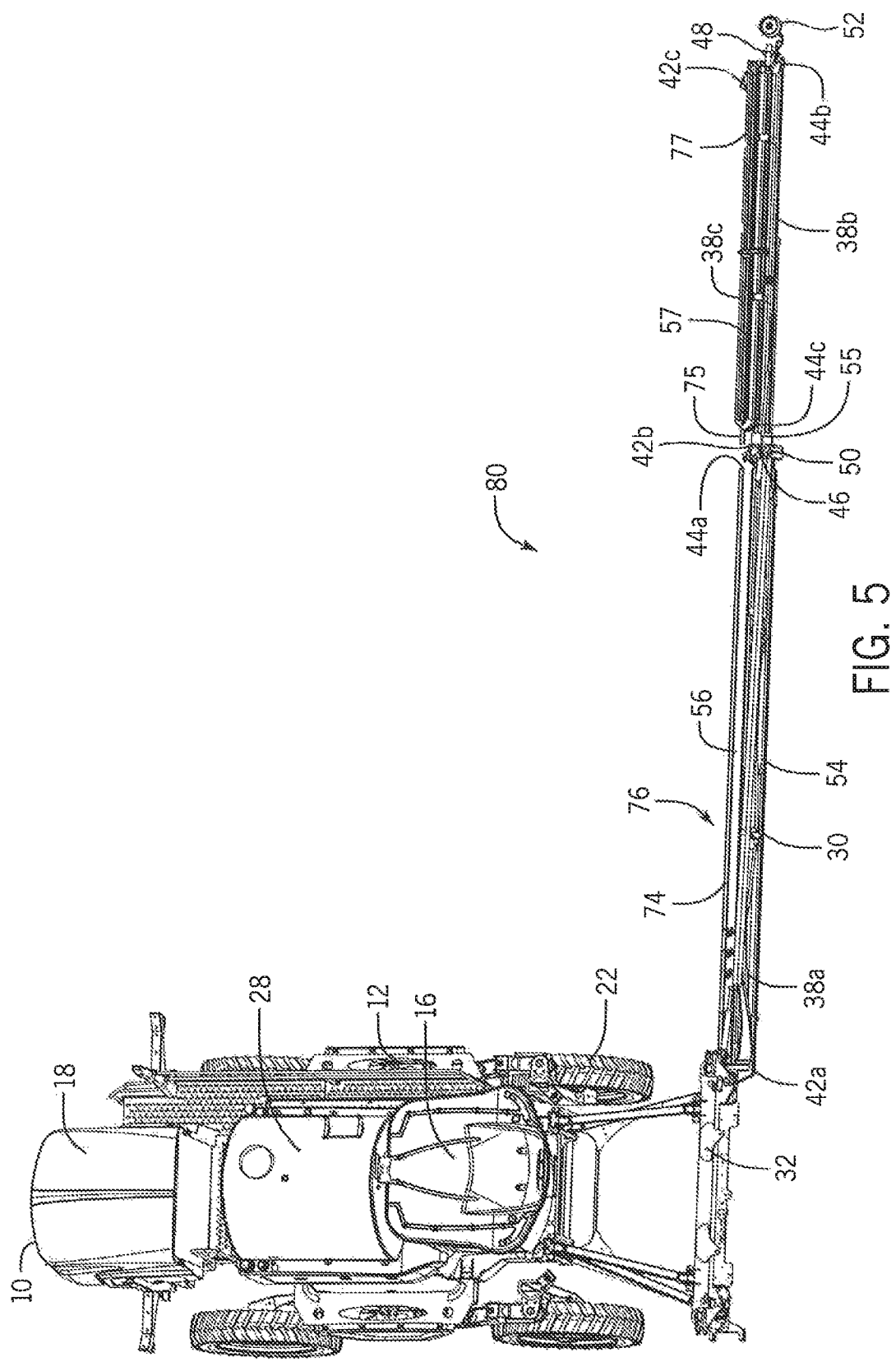
FIG. 5 is a top view of the spray boom of FIG. 4.

FIGS. 4-5 next show the partially folded position 80 of the boom 30. In the partially folded position 80, the first section 38a is maintained parallel to the ground, similar to the extended position 36 shown in FIGS. 1-3. Further, the second section 38b is maintained parallel to the ground and oriented along the same axis as the first section 38a. The third section 38c is oriented parallel to the second section 38b and along an axis that is vertically displaced from that of the second section 38b. That is, as the boom 30 is transitioned from the extended position 36 to the partially folded position 80, the third section 38c is pivoted about the hinge 48 so as to fold inward and be disposed above and parallel to the second section 38b. In turn, the second end 44c of the third section 38c is disposed adjacent the first end 42b of the second section 38b, and the first end 42c of the third section 38c is disposed adjacent the second end 44b of the second section 38b. The third section 38c includes at least one rest 82 disposed on a first surface 84 of the support member 57. The rest is shaped to receive a first surface 85 of the support member 55 of the second section 38b. In the extended position, the first surface 84 of the support member 57 is an upper surface. Meanwhile, in the partially folded position, the first surface 84 of the support member 57 is a lower surface, since the third section 38c has been pivoted 180 degrees about the hinge 48. Conversely, as the boom 30 is transitioned from the partially folded position 80 to the extended position 36, the third section 38c is pivoted about the hinge 48 so as to unfold and be aligned with the second section 38b.

Figure 6:
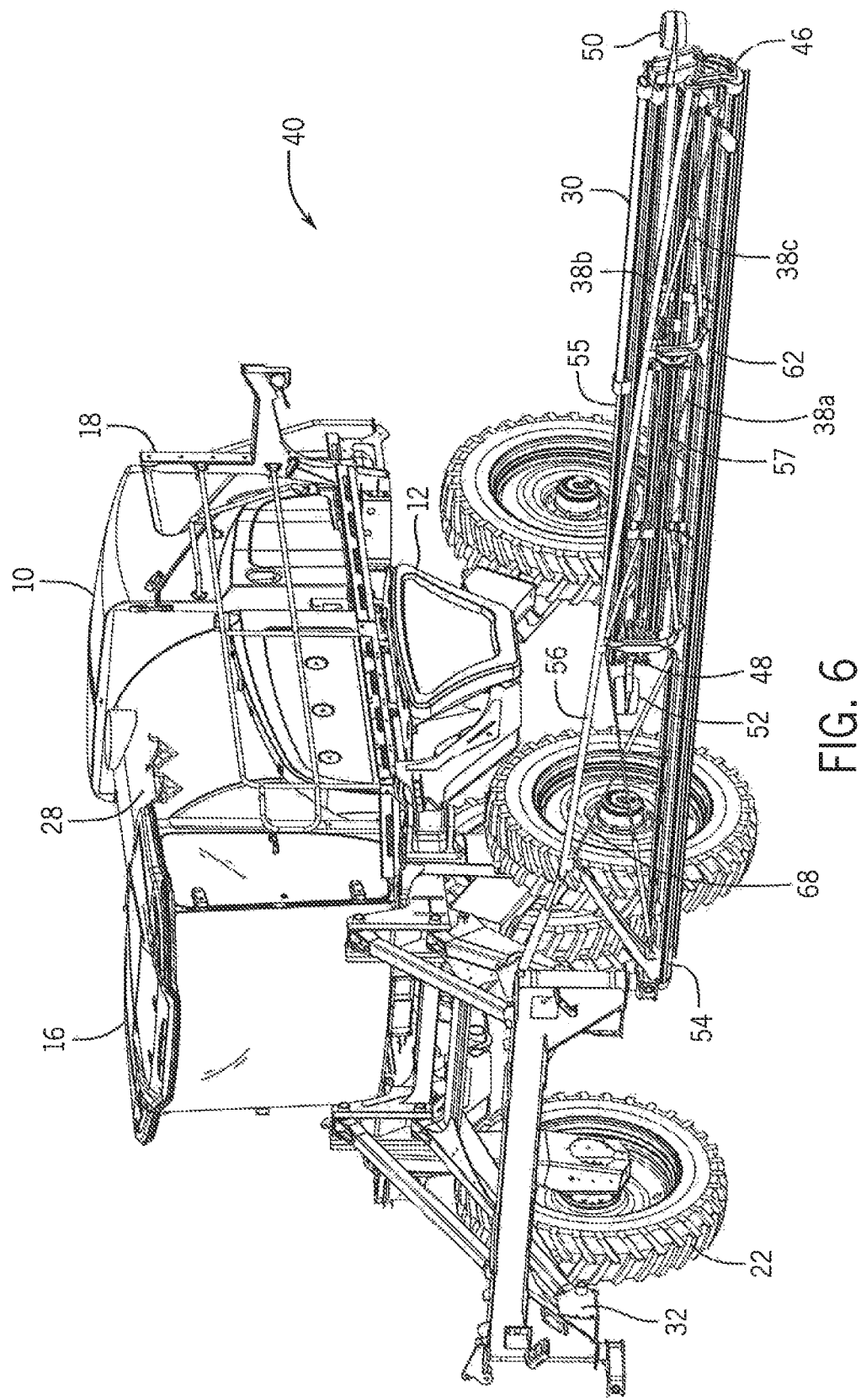
FIG. 6 is a perspective view of the agricultural sprayer having the spray boom in a folded position.
Figure 7:
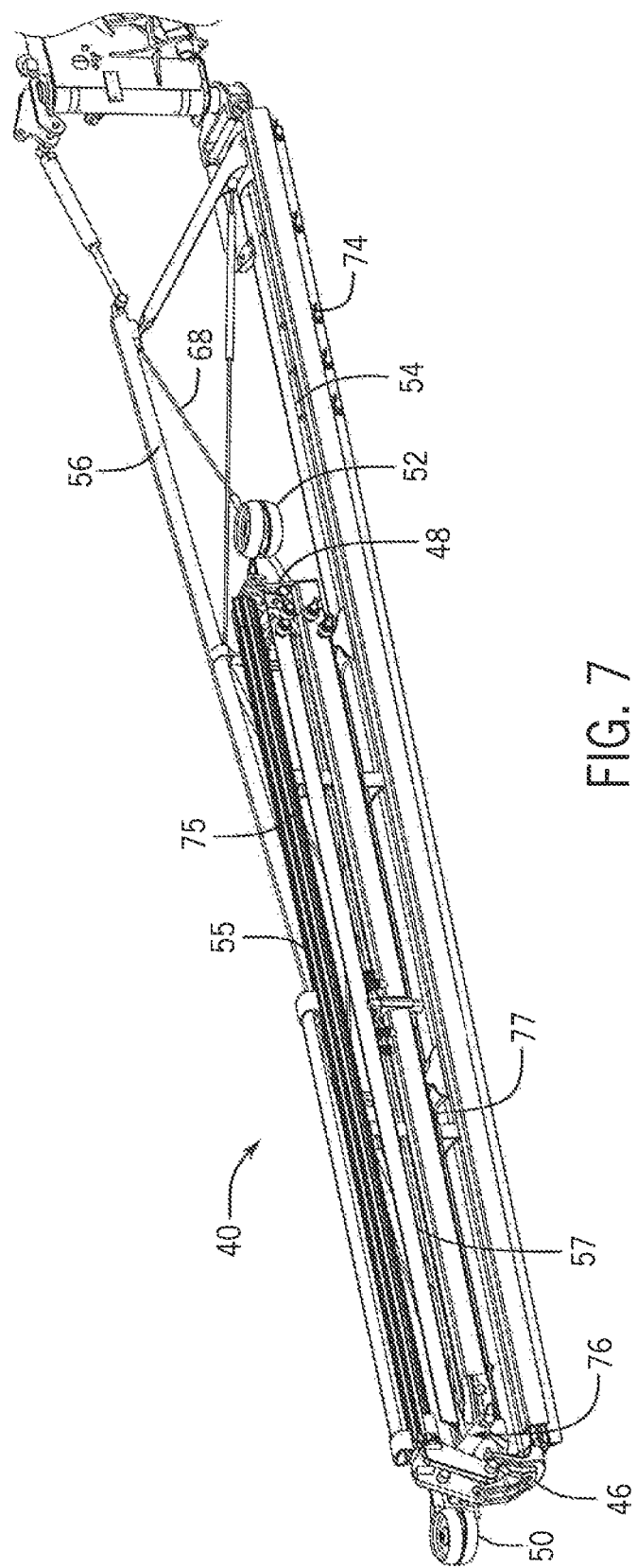
FIG. 7 is an enlarged perspective view of the spray boom of FIG. 6.
Figure 8:
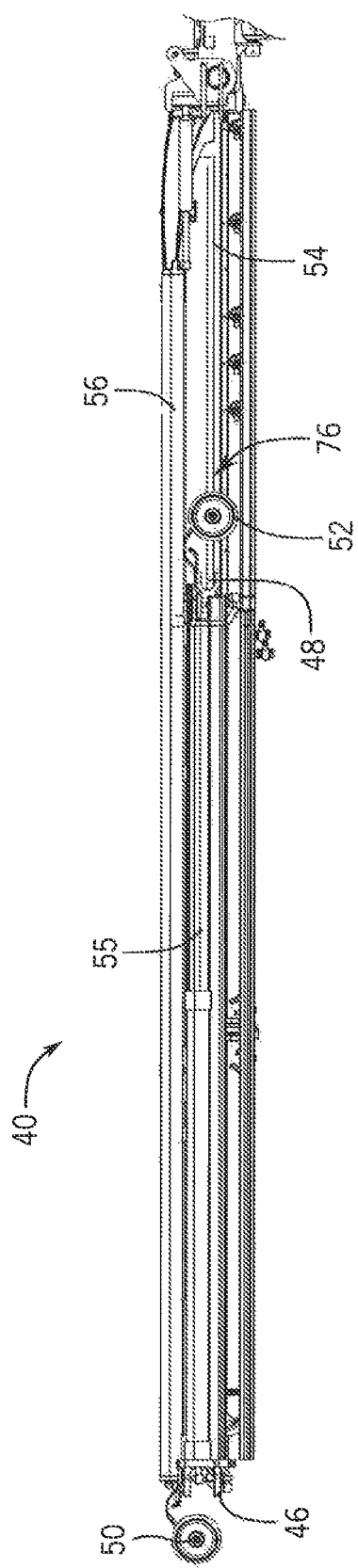
FIG. 8 is a top view of the spray boom of FIG. 7.

Next, FIGS. 6-8 depict the boom 30 in a folded position 40. In the folded position 40, the first section 38a is again maintained parallel to the ground, similar to the above described extended position 36 and partially folded position 80. Meanwhile, the second section 38b is oriented parallel to the first section 38a along an axis that is vertically displaced from that of the first section 38a. Similarly, the third section 38c is oriented parallel to the first and second section 38a, 38b along an axis that is vertically displaced from both those of the first and second sections 38a, 38b. In the representative embodiment of the invention, the third section 38c is disposed vertically between the first and second sections 38a, 38b. As the boom 30 is transitioned from the partially folded position 80 to the folded position 40, the third section 38c and the second section 38b are already aligned parallel to each other and displaced vertically from each other. The second section 38b, and in turn the third section 38c, are then pivoted 180 degrees about the hinge 46 to fold inward and move the second section 38b from aligned with the first section 38a to oriented parallel to and vertically displaced from the first section 38a. Additionally, the second end 44c of the third section 38c is disposed adjacent the first end 42b of the second section 38b, while the first end 42c of the third section 38c is disposed adjacent the second end 44b of the second section 38b. Meanwhile, the second end 44c of the third section 38c and the first end 42b of the second section 38b are disposed adjacent the second end 44a of the first section 38a. In the representative embodiment of the invention, the first end 42c of the third section 38c and the second end 44b of the second section 38b are aligned with a location disposed inward from the first end 42a of the first section 38a. In other embodiments of the invention, the lengths of the second and third sections 38b, 38c may vary. As a result, the first end 42c of the third section 38c and the second end 44b of the second section 38b may be aligned with any location along the length of the first section 38a. Conversely, as the boom 30 is transitioned from the folded position 40 to the partially folded position 80, the second and third sections 38b, 38c are pivoted about the hinge 46 so as to unfold. In turn, the second section 38b is aligned with the first section 38a.

As shown in FIGS. 7 and 8, when the boom 30 is in the folded position 40, the second and third sections 38b, 38c are disposed within the storage opening of the first section 38a. That is, the second and third sections 38b, 38c are disposed rearward of the second support member 54 of the first section 38a and above the first support member 54 of the first section 38a. FIG. 3 further illustrates at least one rest 90 disposed on a first surface 92 of the support member 54. Each rest is shaped to receive a second surface 94 of the support member 57 of the third section 38c so that the third section 38c, and in turn the second section 38b, may rest upon the first support member 54 of the first section 38a. As a result, in the folded position 40, the center of gravity is maintained over the first support member 54 of the first section 38a.

Figure 9:
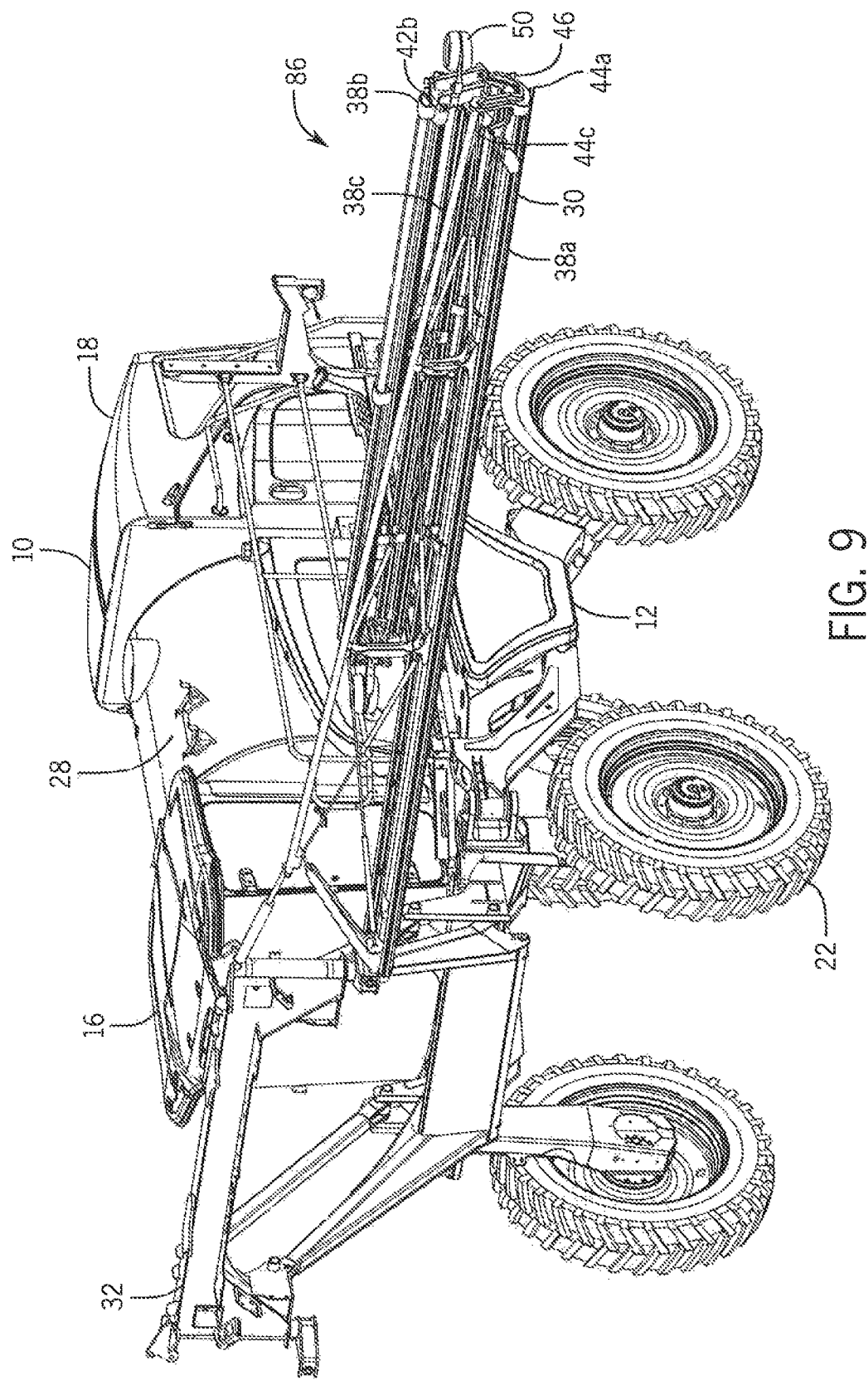
FIG. 9 is a perspective view of the agricultural sprayer having the spray boom in a raised folded position.
Figure 10:
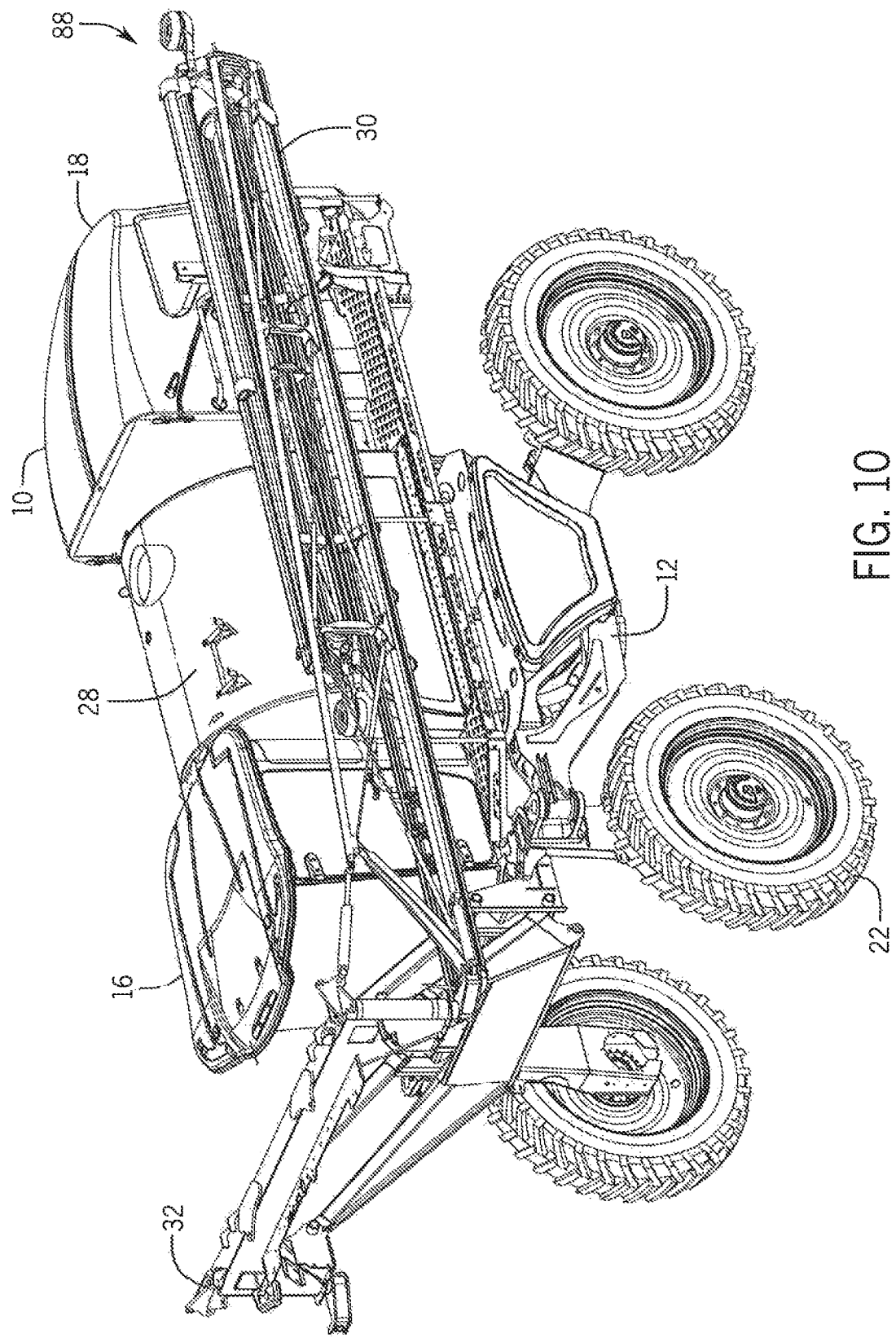
FIG. 10 is a perspective view of the agricultural sprayer having the spray boom in a retracted position.

Now referring to FIG. 9, the boom 30 is shown in a raised folded position 86. In the raised folded position 86, the boom 30 is positioned above the wheels 22 of the sprayer 10. The first, second, and third sections 38a, 38b, 38c of the boom 30 are oriented with respect to each the same as described above in the folded position 86. The boom 30 is transitioned between the raised folded position 86 and the folded position by the lift arm assembly 32.

FIG. 10 next depicts the boom 30 in a retracted position 88. In the retracted position 88, the boom 30 is positioned above the wheels 22, similar to the raised folded position 86 of FIG. 9. In addition, the boom 30 has been rotated 90 degrees about its connection with the lift arm assembly 32 in order to be tucked against the sprayer 10. That is, the boom 30 is moved from perpendicular to the direction of motion of the sprayer 10 to parallel with the direction of motion of the sprayer 10.

It is contemplated that the first section 38a of the boom 30 may be referred to as a primary section of the boom 30. Meanwhile, the second and third sections 38b, 38c of the boom 30 may be referred to as secondary sections of the boom 30. In yet other embodiments of the invention, additional sections, such as a fourth or fifth section, may also be referred to as secondary sections of the boom 30. It should be further noted that while the boom 30 transitions between the extended position 36 of FIG. 1, the partially folded position 80 of FIG. 4, and the folded position 40 of FIG. 6, the primary section of the boom 30 remains in a stationary position, while the secondary sections of the boom 30 are folded upon each other and placed within the storage opening 76 of the primary section of the boom 30.

The present invention has been described in terms of the preferred embodiment. The several embodiments disclosed herein are related as being related to the assembly as generally shown in the drawings. It is recognized that equivalents, alternatives, and modifications, aside from those expressly stated, the embodiments summarized, or the embodiment shown in the drawings, are possible and within the scope of the appending claims. The appending claims cover all such alternatives and equivalents.

What is claimed is:

1. A spray boom for an agricultural machine, the spray boom comprising:
 a first section having a first end and a second end, the first section comprising:
  a first support member;
  a second support member disposed above the first support member;

wherein a centerline of the second support member is horizontally offset from a centerline of the first support member;

a second section having a first end pivotably coupled to the second end of the first section, the second section comprising:

a first support member;

wherein the first section and the second section may be movable between an extended position and a folded position;

wherein in the folded position the second section is disposed above the first support member of the first section and below at least a portion of the second support member of the first section.

2. The spray boom of claim 1, further comprising:

a third section having a first end pivotably coupled to a second end of the second section, the third section comprising:

a first support member;

wherein in the folded position the third section is disposed below the second section.

3. The spray boom of claim 1, wherein the first section further comprises at least one vertical support element, each vertical support element having a first end coupled to the first support member and a second end coupled to the second support member.

4. The spray boom of claim 3, wherein each vertical support element is configured to horizontally offset the centerline of the second support member from the centerline of the first support member.

5. The spray boom of claim 1, wherein the first section further defines a storage opening disposed above the first support member of the first section and rearward of the second support member of the first section.

6. The spray boom of claim 5, wherein the second section is disposed within the storage opening when the spray boom is in the folded position.

7. The spray boom of claim 1, wherein the first support member of the first section is oriented parallel to a ground surface, and wherein the second support member of the first section is oriented at an angle with respect to the first support member.

8. The spray boom of claim 1, wherein in the extended position the first support member of the first section and the first support member of the second section are oriented along an axis.

* * * * *